Patented Dec. 31, 1935

2,026,131

UNITED STATES PATENT OFFICE 2,026,131

PRODUCTION OF METHYL CHLORIDE

Hans Klein, Mannheim, and Conrad Pfaundler, Oppau, Germany, assignors to I. G. Farbenindustrie Aktiengesellschaft, Frankfort-on-the-Main, Germany No Drawing. Application February 9, 1934, Serial No. 710,525. In Germany February 15, 1933

8 Claims. (Cl. 260—162)

The present invention relates to a new process of producing methyl chloride.

It has already been proposed to prepare methyl chloride by heating methanol with hydrogen chloride in the presence of substances splitting off water, such as zinc chloride, the water formed during the reaction being removable from the reaction chamber together with the methyl chloride. It is thus possible to employ the substances splitting off water, as for example zinc chloride, in the form of aqueous solutions without impairing their catalytic activity.

The reaction does not proceed quantitatively, however, especially when it is carried out under commercial conditions, that is when aiming at a good yield per unit of space and time. The occurrence of hydrogen chloride in the waste gas is attended in industrial operation, however, by a number of disadvantages; it leads to corrosion of the condenser which, by reason of the necessity of having good thermal conductivity, cannot be constructed of ceramic material as is the reaction vessel; furthermore the methyl chloride which contains large amounts of hydrogen chloride must be washed with large amounts of water or caustic alkalies whereby the waste by washing is also increased (1 volume of water dissolves for example at room temperature about 4 volumes of methyl chloride); finally the presence of considerable amounts of hydrogen chloride sometimes leads to the formation of hydrochloric acid mists, especially at the commencement of the reaction, and these are very stubborn and cannot be washed out by water or caustic alkalies.

We have now found that all the said disadvantages are directly avoided, and methyl chloride is obtained in a very satisfactory manner by treating methanol with hydrogen chloride in the presence of an aqueous zinc chloride solution, the proportions of methanol and hydrogen chloride being so selected that the methanol is present in molecular excess, preferably in an excess of from 2 to 20 per cent (calculated on the theoretic amount of methanol).

Aqueous zinc chloride solutions of varying concentrations, preferably between 45 and 75 per cent solutions, are suitable. The reaction may be carried out at ordinary or, if desired, elevated pressure. Suitable reaction temperatures are those between 100° and 200° C., preferably between 120° and 130° C.

In this manner a very efficient conversion of the hydrogen chloride is effected so that even with high outputs the methyl chloride, after separation of the water formed during the reaction, contains scarcely any hydrogen chloride. Mists of hydrochloric acid do not occur. In the case of crude methanol which has been obtained by synthesis from carbon monoxide and hydrogen, a proportion of 385 parts by weight of methanol and 395 parts of hydrogen chloride has proved suitable. An output of 500 kilograms of methyl chloride per day can be obtained with each 100 litres of an aqueous zinc chloride solution of 65 to 70 per cent strength without appreciable amounts of hydrogen chloride occurring in the final gas.

It has further been found to be preferable to give the methanol an opportunity to dissolve completely in the zinc chloride solution before it is brought into reaction with the hydrogen chloride. This may be effected for example by introducing the current of methanol vapor separate locally from the current of hydrogen chloride. It may also be preferable to supply the methanol to the zinc chloride solution in a liquid state, as for example by leading in the methanol under a pressure of, say, 4 atmospheres, which prevents its evaporation. Furthermore the methanol may be allowed to flow first into the hot solution of zinc chloride at 125° C., the supply of methanol shut off and hydrogen chloride then introduced until the greater part of the methanol has been consumed, then more methanol added and so on.

It may be also advantageous to dissolve the hydrogen chloride in the zinc chloride solution. By temporarily dissolving both reaction components in the aqueous zinc chloride solutions their satisfactory and rapid interaction is considerably favored.

When supplying methanol in the vapor phase it is advantageous to preheat the vapors to a suitable temperature above the boiling point of methanol in order to regulate the temperature in the reaction vessel.

The following example will further illustrate the nature of this invention but the invention is not restricted to this example. The parts are by weight.

Example 100 parts of a 68 per cent aqueous solution of zinc chloride are heated to 126° C. Methanol is allowed to flow at a speed of 5.3 parts per hour through an inlet opening in the lower third of the vessel and surrounded by a heat-protecting jacket. Hydrogen chloride is simultaneously introduced beneath a perforated plate in the lower part of the vessel at a speed of 5.5 parts per hour. A current of methyl chloride, steam and a little hydrogen chloride escapes from the reaction vessel. After condensation of the steam, a crude methyl chloride is obtained having a hydrogen chloride content of less than 0.1 per cent.

Between 20 and 30 kilograms of methyl chloride may thus be produced with each litre of the said zinc chloride solution.

What we claim is:—

1. The process of producing methyl chloride which comprises reacting hydrogen chloride with methanol in the presence of an aqueous zinc chloride solution, the methanol being used in molecular excess.

2. The process of producing methyl chloride which comprises heating to between 100° C. and 200° C. hydrogen chloride with methanol in the presence of an aqueous zinc chloride solution, the methanol being used in molecular excess.

3. The process of producing methyl chloride which comprises heating to between 120° and 130° C. hydrogen chloride with methanol in the presence of an aqueous zinc chloride solution, the methanol being used in molecular excess.

4. The process of producing methyl chloride which comprises heating hydrogen chloride with methanol in the presence of an aqueous zinc chloride solution, the methanol being used in an excess of from 2 to 20 per cent over the theoretical amount.

5. The process of producing methyl chloride which comprises reacting hydrogen chloride with methanol in the presence of from 45 to 75 per cent aqueous zinc chloride solution, the methanol being used in molecular excess.

6. The process of producing methyl chloride which comprises heating to between 100° and 200° C. hydrogen chloride with methanol in the presence of a from 45 to 75 per cent aqueous zinc chloride solution, the methanol being used in an excess of from 2 to 20 per cent over the theoretical amount.

7. The process of producing methyl chloride which comprises heating to between 120° and 130° C. hydrogen chloride with methanol in the presence of a from 45 to 75 per cent aqueous zinc chloride solution, the methanol being used in an excess of from 2 to 20 per cent over the theoretical amount.

8. The process of producing methyl chloride which comprises causing hydrogen chloride and a molecular excess of methanol to react with one another by temporarily dissolving the said compounds in a from 45 to 75 per cent aqueous solution of zinc chloride while heating to between 100° and 200° C.

HANS KLEIN.
CONRAD PFAUNDLER.